(12) United States Patent
Hayata et al.

(10) Patent No.: US 7,916,261 B2
(45) Date of Patent: Mar. 29, 2011

(54) LIQUID CRYSTAL DISPLAY DEVICE

(75) Inventors: Hiroko Hayata, Mobara (JP); Nobuyuki Ishige, Shirako (JP); Hitoshi Komeno, Mobara (JP)

(73) Assignees: Hitachi Displays, Ltd., Chiba (JP); Hitachi Device Engineering Co., Ltd., Chiba (JP)

( * ) Notice: Subject to any disclaimer, the term of this patent is extended or adjusted under 35 U.S.C. 154(b) by 949 days.

(21) Appl. No.: 11/812,937

(22) Filed: Jun. 22, 2007

(65) Prior Publication Data

US 2007/0252830 A1 Nov. 1, 2007

Related U.S. Application Data

(63) Continuation of application No. 11/082,032, filed on Mar. 17, 2005, now Pat. No. 7,251,009, which is a continuation of application No. 10/621,457, filed on Jul. 18, 2003, now Pat. No. 6,882,397.

(30) Foreign Application Priority Data

Sep. 10, 2002 (JP) .................................. 2002-263571

(51) Int. Cl.
*G02F 1/1345* (2006.01)
(52) U.S. Cl. ........................................ 349/149; 349/152
(58) Field of Classification Search .................. 349/149, 349/150, 151, 152; 324/768, 769, 770; 345/92, 345/206, 904
See application file for complete search history.

(56) References Cited

U.S. PATENT DOCUMENTS

| 5,712,493 | A | 1/1998 | Mori et al. |
| 5,748,267 | A | 5/1998 | Natori et al. |
| 6,624,857 | B1 * | 9/2003 | Nagata et al. .................. 349/54 |
| 6,750,926 | B2 | 6/2004 | Ohgiichi et al. |
| 2002/0140650 | A1 | 10/2002 | Kai et al. |
| 2002/0191140 | A1 | 12/2002 | Eguchi et al. |
| 2003/0075718 | A1 * | 4/2003 | Jang et al. ....................... 257/72 |

FOREIGN PATENT DOCUMENTS

| JP | 11-338376 | 3/1999 |
| JP | 2001-004968 | 6/1999 |
| JP | 2000-147557 | 5/2000 |
| JP | 2003-140165 | 10/2001 |
| JP | 2004-101863 | 4/2004 |

* cited by examiner

*Primary Examiner* — Dung T Nguyen
*Assistant Examiner* — Tai Duong
(74) *Attorney, Agent, or Firm* — Stites & Harbison, PLLC; Juan Carlos A. Marquez, Esq.

(57) ABSTRACT

The present invention provides a liquid crystal display device which can obviate cutting off of a peripheral region of the liquid crystal display device which is provided with an inspection circuit and can surely perform the inspection of an image display even when the peripheral region is narrowed. On a substrate of the liquid crystal display device, a pixel region which is comprised of a plurality of gate lines and a plurality of drain lines and a peripheral region which surrounds the pixel region are formed. A turn-on inspection terminal of the liquid crystal display device are formed on the peripheral region and a semiconductor chip for driving liquid crystal is formed on the inspection terminal. The semiconductor chip is electrically insulated from the inspection terminal.

5 Claims, 5 Drawing Sheets

LIQUID CRYSTAL DISPLAY DEVICE

CROSS-REFERENCE TO RELATED APPLICATIONS

This application is a Continuation of nonprovisional U.S. application Ser. No. 11/082,032 filed on Mar. 17, 2005, now U.S. Pat. No. 7,251,009 which is a Continuation of nonprovisional application Ser. No. 10/621,457 filed on Jul. 18, 2003 now U.S. Pat. No. 6,882,397. Priority is claimed based on U.S. application Ser. No. 11/082,032 filed on Mar. 17, 2005, which claims the priority of U.S. application Ser. No. 10/621,457 filed on Jul. 18, 2003, which claims the priority of Japanese Application 2002-263571 filed on Sep. 10, 2002.

BACKGROUND OF THE INVENTION

The present invention relates to a liquid crystal display device, and more particularly to a liquid crystal display device which narrows a peripheral region surrounding an image display region.

As an image display device, a liquid crystal display device has been known. Particularly, a liquid crystal display device which uses thin film transistors can display images of high definition and hence, such a liquid crystal display device is used as an image display device of a television set, a display for a personal computer or an image display device of a portable terminal.

Recently, with respect to the image display device, while an outer frame is miniaturized, an image display region is enlarged to improve the recognition performance of information. Further, due to the demand for higher definition of display images, the number of pixels is increased and, at the same time, the numbers of gate lines and the drain lines are also increased.

FIG. 5 is a wiring diagram of a transparent substrate and a periphery thereof of a conventional liquid crystal display device.

The liquid crystal display device is configured by arranging two sheets of transparent substrates such that they face each other in an opposed manner while inserting a liquid crystal layer therebetween. On a liquid-crystal-side surface of the first transparent substrate PNL1, a plurality of gate lines GW which extend in the X direction (lateral direction) and are arranged in parallel in the Y direction (longitudinal direction) and a plurality of drain lines (or source lines) DW which are insulated from the gate lines GW, extend in the Y direction and are arranged in parallel in the X direction are provided. Counter electrodes and color filters are formed on the second transparent substrate.

In a region surrounded by two neighboring gate lines GW and two neighboring drain lines DW, a switching element which is turned on in response to a scanning signal from the gate line and a pixel electrode to which a video signal is supplied from the drain line through the switching element are formed thus constituting a pixel. A region in which a plurality of these pixels are formed constitutes a pixel region AR.

A peripheral region PA is provided around the pixel region AR. In the peripheral region PA, a drain drive circuit, a gate drive circuit, and lines which connect these drive circuits to gate lines and the drain lines in the pixel region are formed.

The liquid crystal display device for a portable terminal has a narrow peripheral region. Circuit chips for driving liquid crystal (hereinafter referred to as "drivers") and lines for connection are arranged in the peripheral region of the liquid crystal display device.

Further, the second transparent substrate is formed smaller than the first transparent substrate. With respect to the first transparent substrate, in a region which does not face the second transparent substrate in an opposed manner, a drain driver DDr and a gate driver GDr are formed.

However, the liquid crystal display device which has enlarged the image display region has the narrow peripheral region and hence, it is impossible to ensure a space for mounting inspection terminals for inspecting by turning on a liquid crystal display element. Further, after inspection, the inspection terminals are cut off. Accordingly, the mass productivity of the conventional liquid crystal display device is low.

Even when the inspection terminals are not mounted, it is possible to use connection terminals with the gate driver for gate lines or connection terminals with the drain driver for drain lines as inspection terminals. However, in such a case, the alignment of terminals of an inspection device and the connection terminal becomes difficult.

SUMMARY OF THE INVENTION

According to a first aspect of the present invention, the liquid crystal display device includes transparent substrates which are arranged to face each other in an opposed manner by way of liquid crystal. One transparent substrate includes a plurality of gate lines which extend in the X direction (lateral direction) and are arranged in parallel in the Y direction (longitudinal direction) and a plurality of drain (or source) lines which are insulated from the plurality of gate lines, extend in the Y direction and are arranged in parallel in the X direction. Further, this transparent substrate includes a peripheral region which surrounds a pixel region formed by the plurality of gate lines and the plurality of drain lines.

The first substrate includes the pixel region in which pixel electrodes are formed and the peripheral region which surrounds the pixel region, and a turn-on inspection terminal of the liquid crystal display device are formed on the peripheral region. Over the inspection terminal, a semiconductor chip for driving the liquid crystal is arranged such that the semiconductor chip is electrically insulated from the inspection terminal.

The semiconductor chip is comprised of two semiconductor chips consisting of a drain driver and a gate driver, and the drain driver is arranged over the inspection terminal.

The inspection terminal includes a drain-line inspection terminal and a gate-line inspection terminal.

According to a second aspect of the present invention, the liquid crystal display device is a liquid crystal display device which includes a liquid crystal layer between a first substrate and a second substrate, wherein the first substrate includes a pixel region having pixel electrodes and a peripheral region which surrounds the pixel region, three drain-line inspection terminals and four gate-line inspection terminals are arranged in the peripheral region, and a semiconductor chip is arranged over the three drain-line inspection terminals and the four gate-line inspection terminals.

Further, the drain-line inspection terminals consist of a drain-line inspection terminal for red, a drain-line inspection terminal for green and a drain-line inspection terminal for blue.

Neighboring gate lines are connected to different gate-line inspection terminals.

The present invention can provide a liquid crystal display device which can obviate cutting off of the peripheral region of the liquid crystal display device on which an inspecting circuit is formed and can surely perform the inspection of image display even when the peripheral region is narrowed.

DESCRIPTION OF THE PREFERRED EMBODIMENTS

Preferred embodiments of the present invention are explained in conjunction with drawings.

In respective embodiments, parts having identical functions are indicated by same reference symbols.

Figure 1:
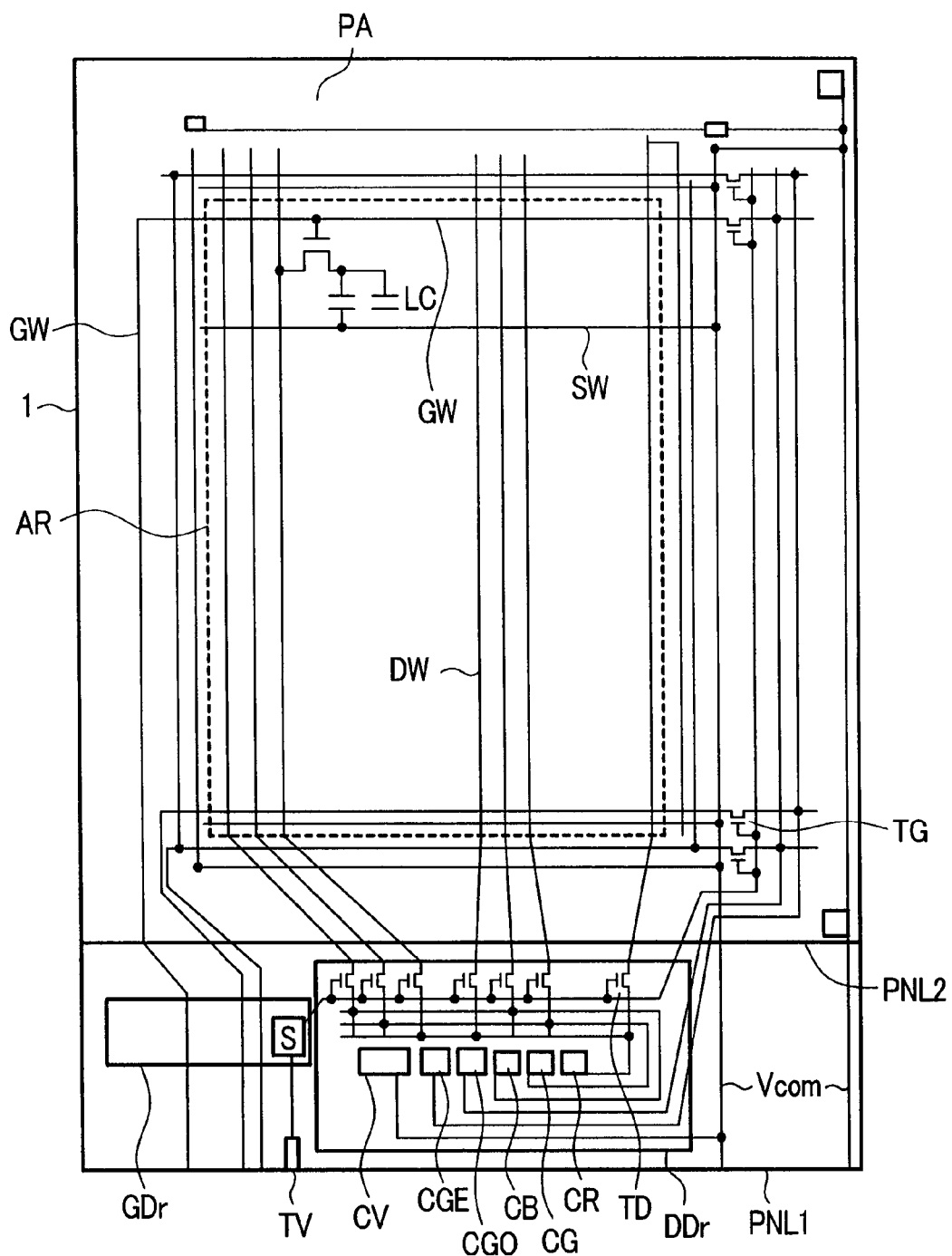
FIG. 1 is a plan view of a substrate of a liquid crystal display device according to the present invention.

FIG. 1 is a plan view of a liquid crystal display device 1 according to the present invention showing lines formed on a first substrate. Further, FIG. 1 is a plan view of the liquid crystal display device for a portable terminal in which a size of an effective screen in the diagonal direction is set to approximately 5.08 cm and also is a plan view of a transparent substrate on which pixel electrodes are formed. The liquid crystal display device shown in FIG. 1 adopts an active matrix system.

The active matrix type liquid crystal display device includes rectangular substrates which are arranged to face each other in an opposed manner and a liquid crystal layer is formed between the first substrate PNL1 and the second substrate PNL2. The second substrate PNL2 is formed smaller than the first substrate PNL1.

On a liquid-crystal-side surface of the first substrate PNL1, gate lines GW which extend in the X direction (lateral direction) and are arranged in parallel in the Y direction (longitudinal direction) and drain lines (or source lines) DW which are insulated from the gate lines GW, extend in the Y direction and are arranged in parallel in the X direction are formed. Holding capacitance lines SW are arranged parallel to the gate lines GW. In FIG. 1, some of the plurality of gate lines GW and the plurality of drain lines DW are described.

In each region surrounded by the gate lines and the drain lines which cross each other, a switching element which is turned on in response to a scanning signal from the gate line and a pixel electrode to which a video signal is supplied from the drain line DW through the switching element are formed thus constituting a pixel. A thin film transistor TFT is used as the switching element.

With respect to the first substrate PNL1, on a region which does not face the second transparent substrate PNL2 in an opposed manner, a drain driver DDr and a gate driver GDr are arranged. Further, the gate driver GDr and the drain driver DDr are mounted on one of short sides of the first substrate PNL1 in a flip-chip method. The gate driver GDr is connected to the gate lines GW and the drain driver DDr is connected to the drain lines DW.

A common electrode is formed on the second substrate PNL2. Further, a capacitor LC is formed by the common electrode and the pixel electrode so as to hold a voltage.

A common line Vcom which is connected to the common electrode is arranged on the first substrate.

Lines shown in FIG. 1 are lines which are formed on the first substrate PNL1.

On a peripheral region PA, gate-line inspection transistors TG and drain-line inspection transistors TD are formed.

The gate-inspection transistors TG are formed on a long side of the first substrate PNL1 and are connected to one ends of the gate lines. Further, another ends of the gate lines are connected to the gate driver GDr.

The odd-numbered gate-line inspection transistors TG have one ends thereof connected to the odd-numbered gate lines GW and another ends thereof connected to the odd-numbered gate-line inspection terminal CGO.

The even-numbered gate-line inspection transistors TG have one ends thereof connected to the even-numbered gate lines GW and another ends thereof connected to the even-numbered gate-line inspection terminal CGE.

The drain-line inspection transistors TD have one ends thereof connected to the drain lines DW and another ends thereof connected to the drain-line inspection terminal for red CR, the drain-line inspection terminal for green CG and the drain-line inspection terminal for blue CB.

Gates of the gate-line inspection transistors TG and the drain-line inspection transistors TD are connected to a common inspecting switch S.

The drain driver DDr is arranged over the odd-numbered gate-line inspection terminal CGO, the even-numbered gate-line inspection terminal CGE, the drain-line inspection terminal for red CR, the drain-line inspection terminal for green CG and the drain-line inspection terminal for blue CB, and an inspecting common terminal CV by way of an anisotropic conductive film. Here, the drain driver DDr and the inspection terminals are electrically insulated from each other.

An inspecting switch S is arranged below the gate driver GDr. The gate driver GDr is also fixed to the first substrate PNL1 by way of an anisotropic conductive film. Here, the gate driver GDr and the inspecting switch terminal are electrically insulated from each other.

Due to such a constitution, it is possible to manufacture the liquid crystal display device without enlarging the peripheral region PA. Further, since the anisotropic conductive film is adhered to the inspection terminal portions, it is possible to prevent the inspection terminal portions from being exposed to outside air as much as possible and hence, the electrolytic corrosion or the corrosion of the inspection terminal portions can be suppressed.

Further, it is unnecessary to cut off portions of the substrate where the inspection terminal is formed and hence, the manufacturing steps of the liquid crystal display device can be simplified. Still further, since the step for cutting off the inspection terminal can be omitted, it is possible to suppress the generation of cut-off chips of the substrate and hence, the defective display attributed to dust can be obviated.

Further, by setting the inspecting switch S at a low level at the time of driving the liquid crystal, it is possible to turn off the gates of all inspection transistors. The substrate is provided with a terminal TV for supplying a voltage for turning off the gates of the inspection transistors.

The inspection method is explained hereinafter.

Figure 2:
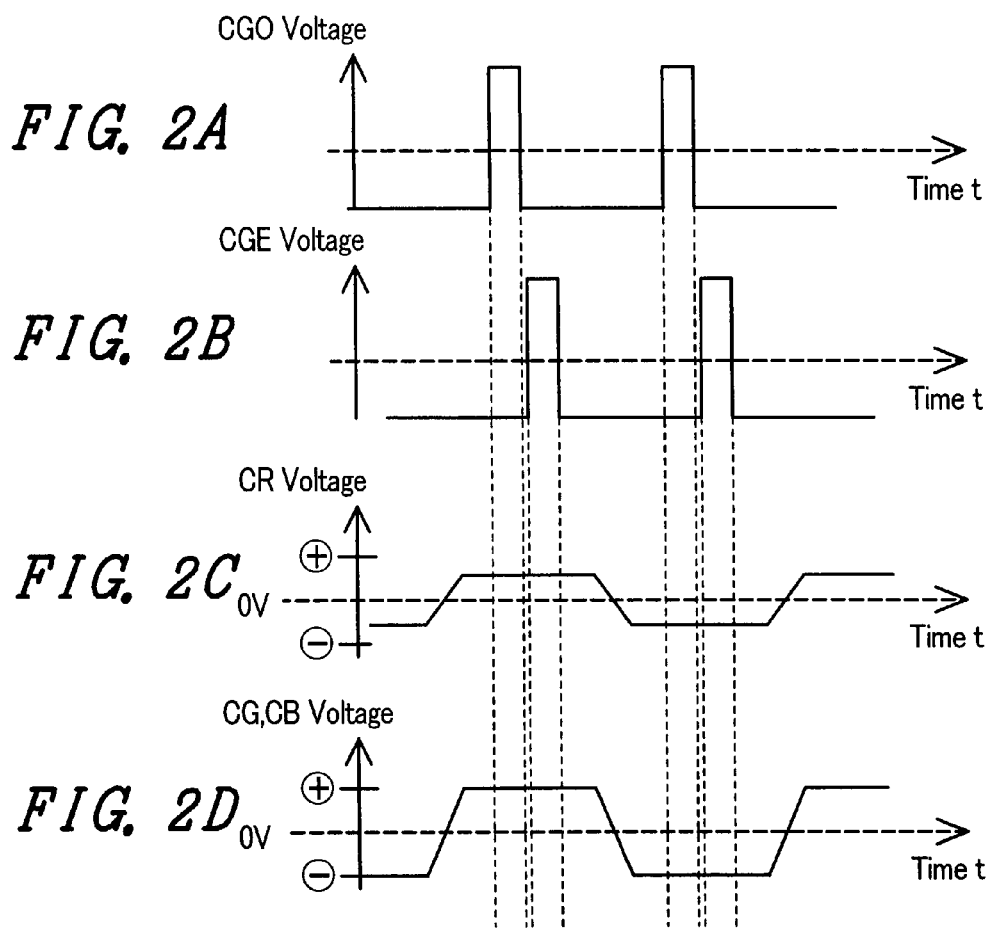
FIG. 2A to FIG. 2D are views showing inspection waveforms of the liquid crystal display device according to the present invention.

FIG. 2A to FIG. 2D show driving waveforms at the time of displaying red, that is, voltage waveforms inputted to the respective inspection terminals. FIG. 2A shows the waveform inputted to the odd-numbered gate line inspection terminal CGO, FIG. 2B shows the waveform inputted to the even-numbered gate line inspection terminal CGE, FIG. 2C shows the waveform inputted to the drain-line inspection terminal for red CR, and FIG. 2D shows the waveforms inputted to the drain-line inspection terminals for green and blue CG, CB. In this embodiment, the liquid crystal display device in a normally white is used.

To the odd-numbered gate-line inspection terminal CGO, pulse voltages having a period of Mms and a pulse width of Nµs are supplied. On the other hand, to the even-numbered gate-line inspection terminal CGE, pulse voltages which have a period thereof displaced from the period of the pulse voltages applied to the odd-numbered gate-line inspection terminal CGO are applied. Due to such a constitution, it is possible to detect short-circuiting between the gate lines.

To the drain-line inspection terminal for red CR, a voltage which reverses a polarity thereof every Mms is supplied. To the drain-line inspection terminals for green and blue CG, CB, a voltage which reverses a polarity thereof every Mms is supplied.

By lowering the voltage supplied to the drain-line inspection terminal for red CR and elevating the voltage supplied to the drain-line inspection terminals for green and blue CG, CB, it is possible to display red. Here, it is possible to inspect short-circuiting between the drain line for red and the drain line arranged close to the drain line for red.

In the same manner, by displaying either one of green or blue, it is possible to inspect short-circuiting between the neighboring drain lines.

The gates of the gate-line inspection transistor TG and the drain-line inspection transistor TD are turned on. Upon completion of the inspection, the gates of the gate-line inspection transistors TG and the drain-line inspection transistors TD are turned off by operating the inspecting switch S. For example, by setting the inspecting switch S to the low level at the time of driving the liquid crystal, it is possible to turn off the gates of all inspection transistors. Since the gates of the inspection transistors are always turned off at the time of driving the liquid crystal, it is possible to display images in a stable manner.

In the liquid crystal display device shown in FIG. 1, since only one inspecting switch S is provided, it is sufficient to provide only one voltage supply terminal at the time of driving.

Further, upon completion of the inspection, the terminals of the drain driver DDr are connected to one ends of respective drain lines.

Figure 3:
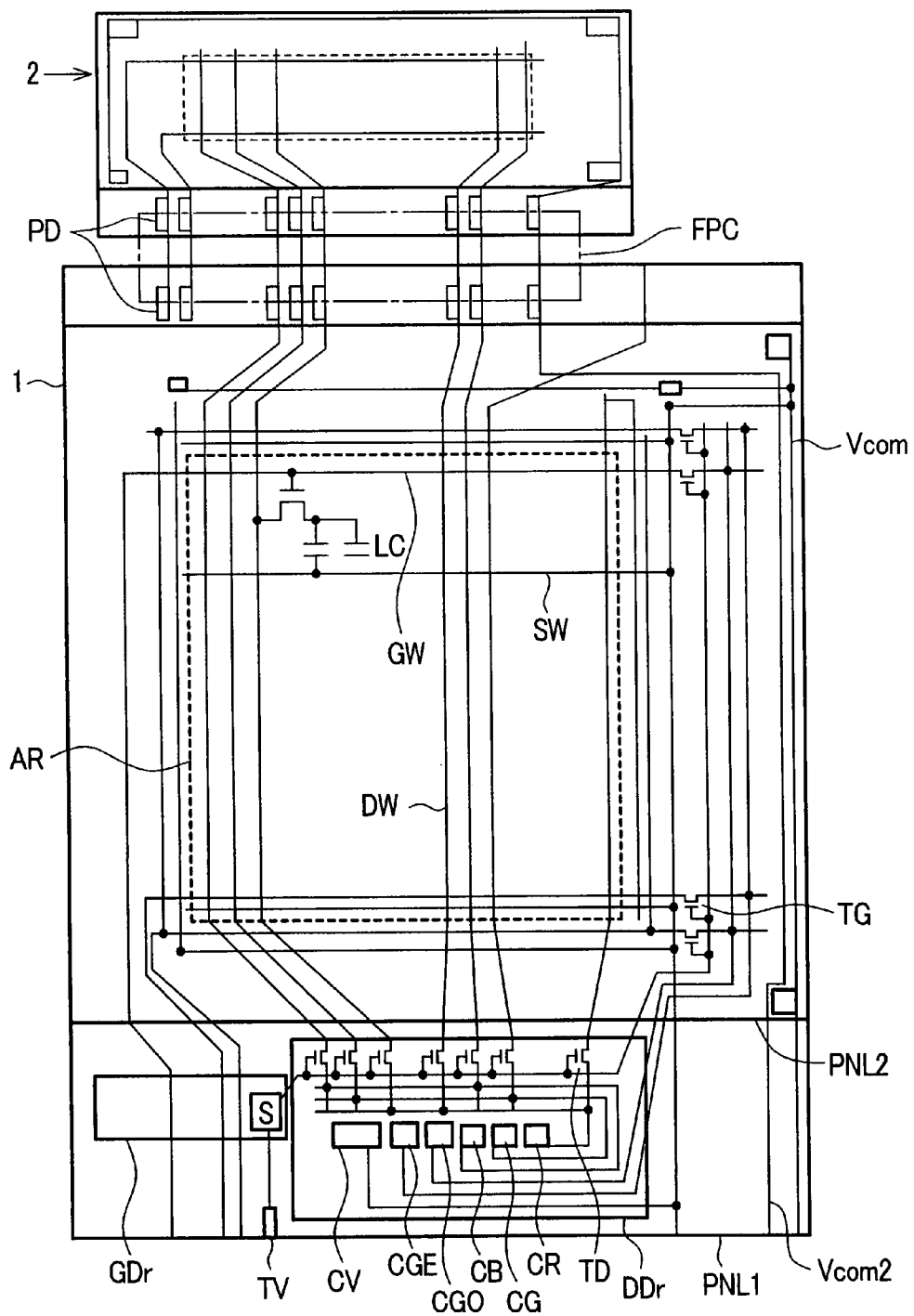
FIG. 3 is a plan view of the substrate having another constitution of the liquid crystal display device of the present invention.

FIG. 3 shows a liquid crystal display device which is comprised of a first liquid crystal display device provided with the gate driver GDr and the drain driver DDr and a second liquid crystal display device 2 which is connected with the first liquid crystal display device by means of a flexible printed circuit board FPC. Some drain lines DW are used by the first liquid crystal display device and the second liquid crystal display device in common.

A second common line Vcom2 which is used in the second liquid crystal display device is arranged on the first substrate.

In the liquid crystal display device shown in FIG. 3, a semiconductor chip for driving liquid crystal is mounted on a short side of one substrate and, at the same time, terminals PD for connecting the first liquid crystal display device to the second liquid crystal display device by way of the flexible printed circuit board FPC are formed on a short side of another substrate. Accordingly, a peripheral region is further narrowed. By applying the present invention to such a liquid crystal display device, it is possible to reduce a contour of the liquid crystal display device.

Figure 4:
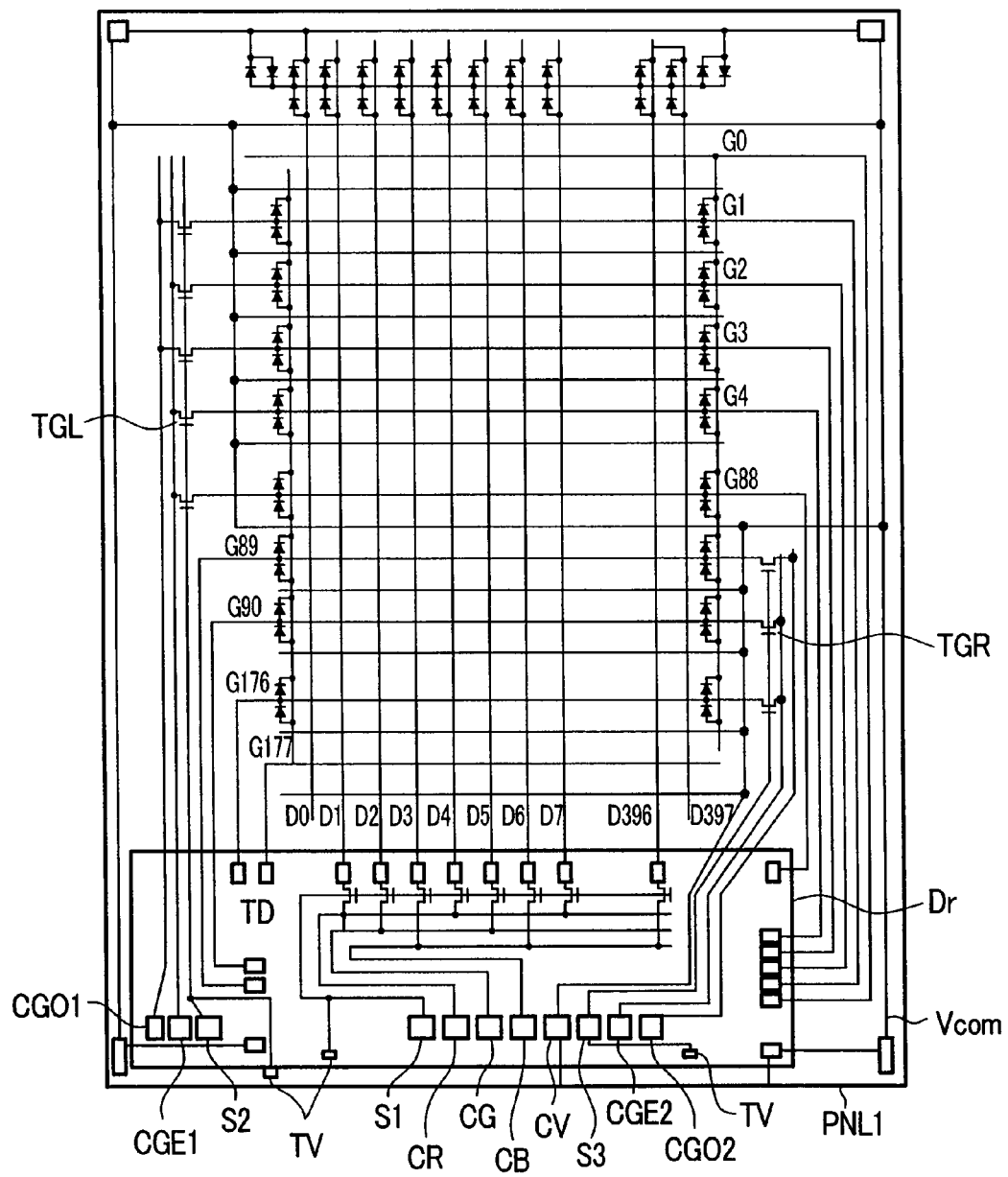
FIG. 4 is a plan view of the substrate having another constitution of the liquid crystal display device of the present invention.
Figure 5:
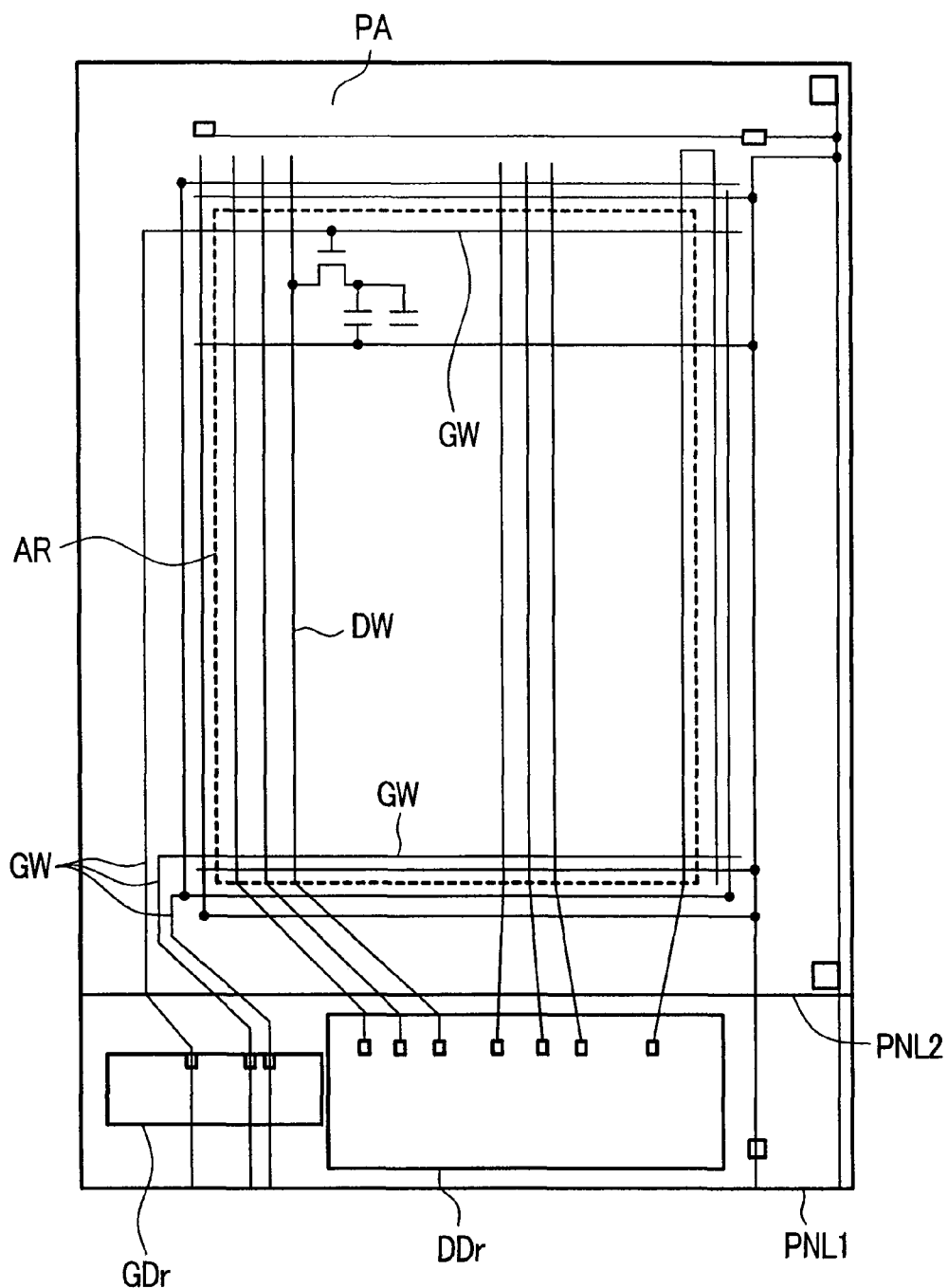
FIG. 5 is a plan view of a substrate of a conventional liquid crystal display device.

FIG. 4 shows a liquid crystal display device which houses a gate driver and a drain driver in one driver Dr. Parts having identical functions as the parts shown in FIG. 1 are indicated by same symbols.

The drain lines DW are constituted of 398 drain lines in total ranging from D0 to D397. The gate lines GW are constituted of 178 gate lines in total ranging from G0 to G177.

In the liquid crystal display device shown in FIG. 4, the gate lines which drive one half of a pixel region remote from the driver Dr run over a right-side peripheral region and are connected to the driver Dr, while the gate lines which drive another half of a pixel region close to the driver Dr run over a left-side peripheral region and are connected to the driver Dr. The drain lines are connected to the driver Dr in a region including a center portion of a long side of the driver.

The gate lines which are connected to the driver Dr after running over the right-side peripheral region of the substrate are connected to gate-line inspection transistors TGL formed on the left side of the substrate.

The gate lines which are connected to the driver Dr after running over the left-side peripheral region of the substrate are connected to gate-line inspection transistors TGR formed on the right side of the substrate.

At a center portion of the substrate, a drain-line inspecting switch terminal S1, a drain-line inspection terminal for red CR, a drain-line inspection terminal for green CG and a drain-line inspection terminal for blue CB are arranged. The drain-line inspecting switch terminal S1 is connected to gates of the drain-line inspection transistors TD.

At the left side of the drain-line inspection terminals, gate-line inspection terminals which run over the right-side peripheral portion of the substrate and are connected to the driver Dr are arranged. As these gate-line inspection terminals, the odd-numbered gate-line inspection terminal CGO1, the even-numbered gate-line inspection terminal CGE1 and the gate-line inspecting switch terminal S2 are arranged.

At the right side of the drain-line inspection terminals, gate-line inspection terminals which run over the left-side peripheral region of the substrate and are connected to the driver Dr are arranged. As these gate-line inspection terminals, the odd-numbered gate-line inspection terminal CGO2, the even-numbered gate-line inspection terminal CGE2 and the gate-line inspecting switch terminal S3 are arranged.

The driver Dr is fixed over these inspection terminals by way of an anisotropic conductive film. Here, the driver Dr and the inspection terminals are electrically insulated from each other.

Due to such a constitution, it is possible to reduce the panel peripheral region which surrounds the display region.

Further, while reducing the panel peripheral region, it is also possible to surely detect an electric short-circuiting between the gate lines GW and an electric short-circuiting between the drain lines DW.

The alignment between the inspection terminals of the display device and terminals of the inspection device can be made easily so that the display device can be manufactured easily.

Since the semiconductor chip is mounted on the inspection terminals by way of the anisotropic conductive film, it is possible to prevent the inspection terminals from exposed to atmosphere whereby the breaking due to static electricity, the electrolytic corrosion or the corrosion can be suppressed.

What is claimed is:
1. An image display device comprising:
a substrate having a plurality of scanning signal lines and a plurality of video signal lines; and
a driver chip mounted on the substrate, wherein the substrate includes video signal line inspection terminals and video signal line inspection transistors, each of the video signal line inspection transistors is arranged between one of the video signal lines and one of the video signal line inspection terminals, the video signal line inspection transistors control a connection between the video signal lines and the video signal line inspection terminals by being turned on during an inspection and being turned off during normally image displaying, and the driver chip is arranged over the video signal line inspection transistors and the video signal line inspection terminals.

2. An image display device according to claim 1, wherein the substrate includes scanning signal line inspection terminals.

3. An image display device according to claim 2, wherein the scanning signal line inspection terminals includes a first scanning signal line inspection terminal and a second scanning signal line inspection terminal, and one of neighboring two scanning signal lines is connected to the first scanning signal line inspection terminal and another of the neighboring two scanning signal lines is connected to the second scanning signal line inspection terminal.

4. An image display device according to claim 1, wherein the video signal line inspection terminals include a video signal line inspection terminal for red, a video signal line inspection terminal for green and a video signal line inspection terminal for blue.

5. An image display device according to claim 1, wherein the image display device includes a second substrate which is arranged to face the substrate in an opposed manner and a liquid crystal layer disposed between the substrate and the second substrate.

* * * * *